United States Patent
Kakizaki et al.

(10) Patent No.: US 8,934,510 B2
(45) Date of Patent: Jan. 13, 2015

(54) WAVELENGTH CONVERTER, WAVELENGTH CONVERTING DEVICE, SOLID STATE LASER DEVICE, AND LASER SYSTEM

(71) Applicant: Gigaphoton Inc., Tochigi (JP)

(72) Inventors: Kouji Kakizaki, Tochigi (JP); Takashi Onose, Tochigi (JP); Hideo Hoshino, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/710,658

(22) Filed: Dec. 11, 2012

(65) Prior Publication Data

US 2013/0202003 A1 Aug. 8, 2013

(30) Foreign Application Priority Data

Feb. 8, 2012 (JP) ................. 2012-025411
Oct. 10, 2012 (JP) ................. 2012-225191

(51) Int. Cl.
*H01S 3/10* (2006.01)
*G02F 1/35* (2006.01)
*H01S 3/23* (2006.01)
*G02F 1/37* (2006.01)
*H01S 3/225* (2006.01)
*H01S 3/00* (2006.01)
*H01S 3/16* (2006.01)

(52) U.S. Cl.
CPC ............ *G02F 1/353* (2013.01); *H01S 3/10007* (2013.01); *H01S 3/2375* (2013.01); *G02F 1/3544* (2013.01); *G02F 1/37* (2013.01); *H01S 3/2251* (2013.01); *H01S 3/2333* (2013.01); *H01S 3/0092* (2013.01); *H01S 3/1625* (2013.01); *G02F 2001/3503* (2013.01)
USPC .................. 372/20; 372/21; 372/22; 372/100

(58) Field of Classification Search
CPC ....... H01S 3/005; H01S 3/0092; H01S 3/025; H01S 3/034; H01S 3/08004; H01S 3/0823; H01S 3/09; H01S 3/108
USPC ...................................... 372/20–22
See application file for complete search history.

(56) References Cited

U.S. PATENT DOCUMENTS

| | | | |
|---|---|---|---|
| 6,859,305 B2 | 2/2005 | Chen et al. | |
| 2002/0154384 A1* | 10/2002 | Chen et al. | 359/326 |
| 2013/0064259 A1* | 3/2013 | Wakabayashi et al. | 372/38.1 |

* cited by examiner

*Primary Examiner* — Dung Nguyen
(74) *Attorney, Agent, or Firm* — Kratz, Quintos & Hanson, LLP

(57) ABSTRACT

A wavelength converter may include a non-linear optical crystal, and an optical member bonded to a region of a contact surface of the non-linear optical crystal, located a predetermined distance or more on an inner side from an outer periphery of the contact surface. The wavelength converter may receive laser light and stably output light having a wavelength different from that of the laser light.

19 Claims, 11 Drawing Sheets

WAVELENGTH CONVERTER, WAVELENGTH CONVERTING DEVICE, SOLID STATE LASER DEVICE, AND LASER SYSTEM

CROSS-REFERENCE TO RELATED APPLICATIONS

This application is based upon and claims the benefit of priority of the prior Japanese Patent Applications No. 2012-025411 filed on Feb. 8, 2012, and No. 2012-225191 filed on Oct. 10, 2012, the entire contents of which are incorporated herein by reference.

BACKGROUND

1. Technical Field

The present disclosure relates to a wavelength converter, a wavelength converting device, a solid state laser device, and a laser system.

2. Related Art

Excimer lasers, that are typical ultraviolet light sources used in semiconductor lithography processes, may include KrF excimer lasers having a wavelength of approximately 248 nm, and ArF excimer lasers having a wavelength of approximately 193 nm.

Most ArF excimer lasers may be supplied to the market as two-stage laser systems including an oscillation stage laser and an amplification stage. A description will be given of a main configuration common to the oscillation stage laser and the amplification stage of the two-stage ArF excimer laser system. The oscillation stage laser may include a first chamber, and the amplification stage may include a second chamber. The insides of the first and second chambers may be filled with laser gas (mixture gas of $F_2$, Ar, Ne, and Xe). The oscillation stage laser and the amplification stage may further include a power supply to supply electrical energy for exciting the laser gas. The oscillation stage laser and the amplification stage may each include the power supply, or the oscillation stage laser and the amplification stage may share a single power supply. First discharge electrodes, including a first anode and a first cathode respectively connected to the power supply, may be provided within the first chamber. Similarly, second discharge electrodes, including a second anode and a second cathode respectively connected to the power supply, may be provided within the second chamber.

The configuration unique to the oscillation stage laser may include, for example, a line-narrowing module. The line-narrowing module may typically include one grating, and at least one prism beam expander. A partial reflecting mirror and the grating may form an optical resonator, and the first chamber of the oscillation stage laser may be provided between the partial reflecting mirror and the grating.

When the electrical energy from the power supply is supplied to the first discharge electrodes and a discharge is generated between the first anode and the first cathode, the laser gas may be excited, and light may be generated when excitation energy is emitted. The light may be formed into laser light having the wavelength narrowed by the line-narrowing module, and the laser light may be output from the oscillation stage laser.

The two-stage laser system in which the amplification stage includes a resonator configuration may be referred to as a MOPO (Master Oscillator Power Oscillator), and the two-stage laser system in which the amplification stage includes no resonator configuration may be referred to as a MOPA (Master Oscillator Power Amplifier). When the laser light from the oscillation stage passes through the second chamber of the amplification stage, a control may be performed to generate a discharge between the second anode and the second cathode of the second discharge electrodes. Hence, the laser gas within the second chamber may be excited, and the laser light may be amplified and output from the amplification stage.

A related technique may be found in a U.S. Pat. No. 6,859,305, for example.

SUMMARY

According to one aspect of the present disclosure, a wavelength converter may include a first non-linear optical crystal having a first contact surface; and a first optical member bonded to a region of the first contact surface, located a predetermined distance or more on an inner side from an outer periphery of the first contact surface, wherein the wavelength converter receives laser light and outputs light having a wavelength different from that of the laser light.

According to another aspect of the present disclosure, a wavelength converter may include a first non-linear optical crystal having a first contact surface; a first intermediate layer bonded to a region of the first contact surface, located a predetermined distance or more on an inner side from an outer periphery of the first contact surface, the first intermediate layer having a second contact surface on an opposite side from the first contact surface; and a first optical member bonded to the second contact surface of the first intermediate layer, wherein the wavelength converter receives laser light and outputs light having a wavelength different from that of the laser light.

According to another aspect of the present disclosure, a wavelength converting device may include a wavelength converter having a configuration described above; and a holder configured to hold wavelength converter in a state in which pressure urging the first prism towards the second prism is applied via the first and second intermediate layers and the first and second non-linear optical crystals, wherein the wavelength converting device converts the laser light into the light having the wavelength different from that of the laser light.

According to another aspect of the present disclosure, a solid state laser device may include a laser configured to output laser light; an amplifier configured to amplify the laser light; and a wavelength converter having the configuration described above, and configured to subject the laser light amplified by the amplifier to a wavelength conversion.

According to another aspect of the present disclosure, a laser system may include a solid state laser device having a configuration described above; and an amplifier device configured to amplify the laser light output from the solid state laser device.

BRIEF DESCRIPTION OF THE DRAWINGS

Embodiments of the present disclosure will be described below, as simple examples, with reference to the accompanying drawings.

DETAILED DESCRIPTION

Figure 1:
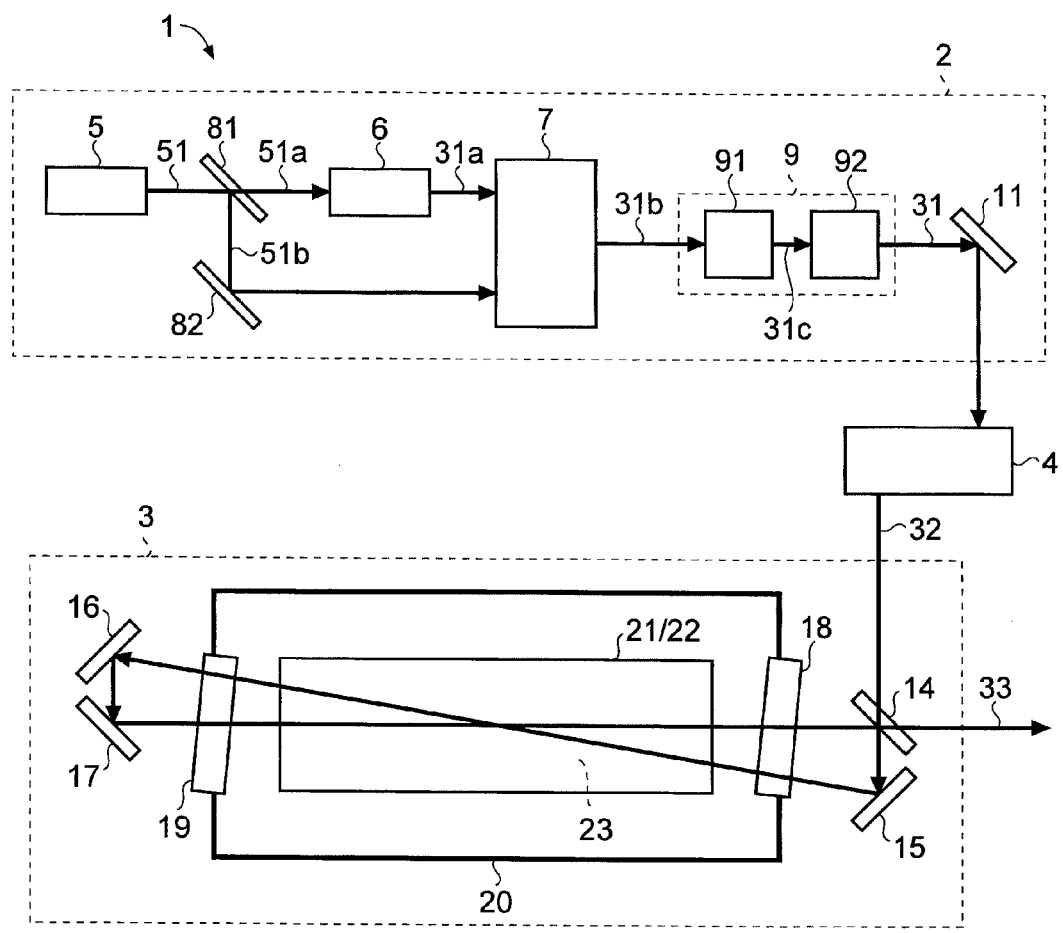
FIG. 1 schematically illustrates an example of a configuration of a two-stage laser device according to the present disclosure.

A detailed description will hereinafter be given of embodiments of the present disclosure, by referring to the drawings. The embodiments described hereinafter are examples of the present disclosure, and contents of the present disclosure are not limited to these embodiments. In addition, configurations and operations of each embodiment that is described hereinafter are not necessarily required in their entirety as configurations and operations of the present disclosure. Those constituent elements that are the same are designated by the same reference characters, and redundant description thereof will be omitted. The description will hereinafter be given along the following table of contents.

| Table of Contents |
|---|
| 1. Outline |
| 2. Description of Terminologies |
| 3. Laser System Having Solid State Laser Device That Includes Wavelength Converter Element, and ArF Amplifier |
|    3.1 Configuration |
|    3.2 Operation |
| 4. Wavelength Converter Having Optical Element Arranged On At Least One Surface Side of Non-Linear Optical Crystal (First Embodiment) |
|    4.1 Configuration |
|    4.2 Operation |
|    4.3 Effects |
|    4.4 Variations of Optical Element |
|       4.4.1 First Example |
|       4.4.2 Second Example |
|       4.4.3 Third Example |
| 5. Wavelength Converter Having Optical Element Arranged On At Least One Surface Side of Non-Linear Optical Crystal With Intermediate Layer Interposed Between Optical Element and Non-Linear Optical Crystal (Second Embodiment) |
|    5.1 Configuration |
|    5.2 Operation |
|    5.3 Effects |
| 6. Wavelength Converter Having Optical Element On Each of At Least Two Surface Sides of Non-Linear Optical Crystal (Third Embodiment) |
|    6.1 Configuration |
|    6.2 Operation |
|    6.3 Effects |
| 7. Wavelength Converter Having Optical Element On Each of At Least Two Surface Sides of Non-Linear Optical Crystal With Intermediate Layer Interposed Between Each Optical Element and Non-Linear Optical Crystal (Fourth Embodiment) |
|    7.1 Configuration |
|    7.2 Operation |
|    7.3 Effects |
| 8. Wavelength Converter Having At Least Two Non-Linear Optical Crystals |
|    8.1 Case In Which Non-Linear Optical Crystals Mutually Form Optical Contact (Fifth Embodiment) |
|       8.1.1 Configuration |
|       8.1.2 Operation |
|       8.1.3 Effects |
|       8.1.4 Modification |
|    8.2 Case In Which Intermediate Layer Is Arranged Between Non-Linear Optical Elements (Sixth Embodiment) |
|       8.2.1 Configuration |
|       8.2.2 Operation |
|       8.2.3 Effects |
|       8.2.4 Modification |
| 9. Wavelength Converter In which Optical Path of Light Within Non-Linear Optical Crystal Returns Two Or More Times (Seventh Embodiment) |
|    9.1 Configuration |
|    9.2 Operation |
|    9.3 Effects |
|    9.4 Modification |
| 10. Holder for Wavelength Converter Having Configuration In Which Non-Linear Optical Element Is Interposed Between Two Optical Elements (Eighth Embodiment) |
|    10.1 Configuration |
|    10.2 Effects |

1. Outline

A description will hereinafter be given with respect to an outline of the embodiments.

A KBBF ($KBe_2BO_3F_2$) crystal may be able to generate a second harmonic of 193 nm by SHG (Second Harmonic Generation). In addition, the KBBF crystal may be transparent with respect to light having a wavelength of 160 nm or less, and may have a characteristic with no hygroscopicity.

However, crystal growth of the KBBF crystal may be difficult to achieve, and the KBBF crystal may have a characteristic with high cleavage. For this reason, it may be difficult to cut the KBBF crystal at a phase matching angle. The cleavage, in general, may refer to a property of the crystal that tends to split in a particular direction of the crystal when physical shock is applied to the crystal.

When making a wavelength conversion to convert light having a wavelength of approximately 773 nm into light in a DUV (Deep Ultra-Violet) region using the KBBF crystal, the phase matching angle may exceed a critical angle. For this reason, normally, in the wavelength conversion to the DUV region, a PCD (Prism Coupling Device) may be used. The PCD may be a device having a prism bonded to a crystal surface. By using this device, it may be possible to guide the light input to and the light emitted from the KBBF crystal, based on a relationship of refractive indexes of an air layer, the prism, and the crystal.

In the PCD using the KBBF crystal, a transmittance at a contact part may deteriorate when a quality of the contact part is poor. This in turn may cause the conversion efficiency to deteriorate, and generate damage at the contact part.

The quality of the contact part may depend on an adhesion accuracy of the crystal and the prism. In general, the optical elements to be bonded may be bonded automatically by sufficiently improving a profile irregularity and a surface roughness of a contact surface of the optical element. This bonding technique may be referred to as optical contact (or optical contact bonding), which may achieve an extremely high adhesion accuracy. However, as described above, the KBBF crystal may have the cleavage. For this reason, even after polishing, an end part of the KBBF crystal may build up, and it may be impossible to obtain a sufficiently low profile irregularity for the contact surface. As a result, it may be impossible to bond the KBBF crystal and the prism by the optical contact. Hence, in the conventional PCD, a method of applying pressure on the KBBF crystal and the prism may be used to bond the KBBF crystal and the prism.

But according to the method of applying the pressure on the KBBF crystal and the prism, stress may be applied to the crystal at a time of the bonding.

Accordingly, the deterioration of the contact surface, the damage of the crystal, and the like may be generated due to micro cleavage.

In addition, conventionally, a holder may be used to hold the KBBF crystal and the prism in a state in which the pressure is applied thereon, in order to maintain the quality of the contact part between the KBBF crystal and the prism. In a single prism coupling device in which a single prism is mounted on the KBBF crystal, it may be required to totally reflect the light incident on the KBBF crystal, from at least a part of a surface of the KBBF crystal on an opposite side from a surface bonded to the prism. In order to make at least a part of the KBBF crystal surface a total reflection region, it may be required to provide a space (groove, hole, etc.) for making the air layer make contact with this region in the holder; however, a pressing force of the holder may be insufficient at the part where this space is provided. For this reason, a part where the pressure for maintaining the bonding of the KBBF crystal and the prism cannot be applied may be generated. As a result, a space may be formed between the prism and the crystal, and prevent the light from being input to the crystal.

Further, when creating a stacked structure in which a plurality of KBBF crystals are stacked, the effects of the build-up of the end part caused by the cleavage may become stronger as the number of stacked KBBF crystals increases.

Moreover, in a device obtained by bonding in the conventional method, when the pressure applied to bond the crystal and the prism is reduced, the part that is released from the pressure may tend to separate. As a result, the micro-cleavage may be generated by the separation. For this reason, in a manufacturing process of the device, the prism, the crystal, and the like may be required to be stacked and simultaneously pressed.

Accordingly, the embodiments described hereinafter may use a configuration in which the optical element does not make contact with the end part of the KBBF crystal. According to this configuration, the KBBF crystal and the optical element may be bonded in a region other than a part where the profile irregularity may deteriorate due to the cleavage and the like, and an optical contact having a high quality may be formed at a contact part between the KBBF crystal and the optical element.

2. Description of Terminologies

A KBBF crystal may refer to a non-linear optical crystal represented by a chemical formula $KBe_2BO_3F_2$.

An optical path may refer to a path or route through which laser light propagates. An optical axis may refer to an axis passing through an approximate center of a beam cross section of the laser light along a traveling direction of the laser light.

An upstream side of the optical path may refer to a side closer to a light source. In addition, a downstream side of the optical path may refer to a side closer to an exposure apparatus.

A prism may refer to an optical element that has two surfaces that are mutually non-parallel, and is formed by a material at least capable of transmitting the laser light. A bottom surface and a top surface of the prism are not limited to a triangular shape or a shape similar to the triangular shape. An optical element obtained by deforming the shape of the prism, such as by grinding the peak of the prism, may also be included in the prism referred to in the present disclosure.

In the present disclosure, a Z-direction is defined as the traveling direction of the laser light. In addition, an X-direction is defined as one direction perpendicular to the Z-direction, and a Y-direction is defined as a direction perpendicular to both the X-direction and the Z-direction. The traveling direction of the laser light is the Z-direction; however, the X-direction and the Y-direction may change depending on the position of the laser light referred to in the description. For example, after the traveling direction (Z-direction) of the laser light changes within an X-Z plane, the X-direction changes depending on the change in the traveling direction, but the Y-direction does not change. On the other hand, after the traveling direction (Z-direction) of the laser light changes within a Y-Z plane, the Y-direction changes depending on the change in the traveling direction, but the X-direction does not change. For the sake of clarity, in each of the figures, for the shown optical elements, a coordinate system may be illustrated where appropriate, with respect to the laser light incident on an optical element located at a most upstream side, and the laser light emitted from an optical element located at a most downstream side. In addition, the coordinate system of the laser light incident on other optical elements may be illustrated where appropriate.

With regard to a reflection optical element, when an incident plane is defined as a plane including both the optical path of the laser light incident on the optical element and the optical path of the laser light reflected by the optical element, "S-polarized" may be defined as a polarization state in a direction perpendicular to the incident plane. On the other hand, "P-polarized" may be defined as a polarization state in a direction perpendicular to the optical path and parallel to the incident plane.

3. Laser System Having Solid State Laser Device That Includes Wavelength Converter Element, and ArF Amplifier First, a detailed description will be given of the entire outline of the laser system according to the present disclosure, using the drawings. In the following, a two-stage laser device is described as an example of the laser system.

3.1 Configuration

Figure 2:
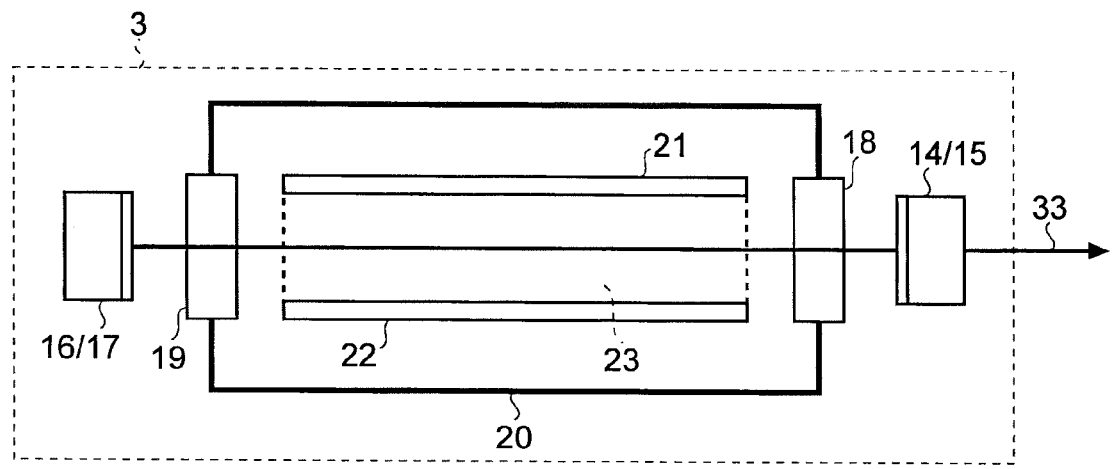
FIG. 2 schematically illustrates an example of a configuration of an amplifier device illustrated in FIG. 1, as a cross section different from a cross section illustrated in FIG. 1.

FIG. 1 schematically illustrates an example of a configuration of the two-stage laser device according to the present disclosure. FIG. 2 schematically illustrates an example of a configuration of an amplifier device illustrated in FIG. 1, as a cross section different from a cross section illustrated in FIG. 1.

As illustrated in FIGS. 1 and 2, a laser system 1, that is the two-stage laser device, may include a solid state laser device 2, and an amplifier device 3. The solid stage laser device 2 may include a wavelength converting element, for example. The amplifier device 3 may be a discharge excitation ArF excimer amplifier, for example. A low coherence optical system 4 may be provided between the solid state laser device 2 and the amplifier device 3. An optical system using a pulse stretcher, a random phase plate, and the like may be employed as the low coherence optical system 4.

Next, a description will be given of the solid state laser device 2. The solid state laser device 2 may include a pump laser 5, a Ti:sapphire laser 6, an amplifier 7, a beam splitter 81, a high reflection mirror 82, a wavelength converting device 9, and a high reflection mirror 11.

The pump laser 5 may be a laser that outputs second harmonic light of a semiconductor laser excitation Nd:YAG laser, for example. The Ti:sapphire laser 6 may include a Ti:sapphire crystal and an optical resonator. The amplifier 7 may be an amplifier including a Ti:sapphire crystal. The wavelength converting device 9 may include a first wavelength converter 91 and a second wavelength converter 92. The first wavelength converter 91 may include a LBO crystal as the wavelength converting element. The second wavelength converter 92 may include a KBBF crystal as the wavelength converting element.

Next, a description will be given of the amplifier device 3. The amplifier device 3 may include a chamber 20, an anode 21 and a cathode 22 forming a pair of discharge electrodes, an output coupling mirror 14, and high reflection mirrors 15, 16, and 17. The inside of the chamber 20 may be filled with laser gas. This laser gas may be a mixture gas of Ar, Ne, $F_2$, and Xe. The anode 21 and the cathode 22 may be provided inside the chamber 20. As illustrated in FIG. 2, the anode 21 and the cathode 22 may be arranged with a gap formed therebetween in a vertical direction on the drawing sheet and parallel to the drawing sheet. However, the anode 21 and the cathode 22 are not limited to this arrangement, and may be arranged with a gap formed therebetween in a direction perpendicular to the drawing sheet.

A discharge space 23 may be formed between the anode 21 and the cathode 22. A discharge may be generated in this discharge space 23 when discharge power is supplied to the anode 21 and the cathode 22. Windows 18 and 19 capable of transmitting pulsed laser light 32 may be mounted on the chamber 20. In addition, a power supply (not shown) may be provided externally to the chamber 20. This power supply may supply the discharge power to the anode 21 and the cathode 22.

The output coupling mirror 14 and the high reflection mirrors 15, 16, and 17 may form a ring optical resonator. The output coupling mirror 14 may be an optical element capable of transmitting a part of the light and reflecting a part of the light.

3.2 Operation

The solid state laser device 2 may output pulsed laser light 31 having a wavelength of approximately 193 nm. The low coherence optical system 4 may lower the coherency of the pulsed laser light 31. The amplifier device 3 may amplify the pulsed laser light 32 having the lowered coherency, and output the amplified pulsed laser light 32 as pulsed laser light 33. The pulsed laser light 33 may be supplied to the exposure apparatus (not shown), for example, to be used for a lithography process.

Excitation light 51 having a wavelength of approximately 532 nm may be output from the pump laser 5. A part of the excitation light 51 may be transmitted through the beam splitter 81. Another part of the excitation light 51 may be reflected by the beam splitter 81. Excitation light 51a transmitted through the beam splitter 81 may excite the Ti:sapphire crystal of the Ti:sapphire laser 6. Light emitted from the excited crystal may be amplified within the resonator, and pulsed laser light 31a having a wavelength of approximately 773.6 nm may be output from the Ti:sapphire laser 6. The Ti:sapphire laser 6 may include an optical resonator having a wavelength selecting element (not shown). In this case, the Ti:sapphire laser 6 may output the pulsed laser light 31a having a spectral width narrowed by the wavelength selecting element.

On the other hand, of the excitation light 51 output from the pump laser 5, excitation light 51b reflected by the beam splitter 81 may further be reflected by the high reflection mirror 82. The reflected excitation light 51b may be input to the Ti:sapphire amplifier 7 in order to excite the Ti:sapphire crystal of the amplifier 7. The amplifier 7 may use its excitation energy to amplify the pulsed laser light 31a output from the Ti:sapphire laser 6. As a result, amplified pulsed laser light 31b having a wavelength of approximately 773.6 nm may be output from the amplifier 7.

The pulsed laser light 31b output from the Ti:sapphire amplifier 7 may be input to the wavelength converting device 9. The pulsed laser light 31b input to the wavelength converting device 9 may first be input to the first wavelength converter 91. The LBO crystal of the first wavelength converter 91 may convert the input pulsed laser light 31b into pulsed laser light 31c having a wavelength of approximately 386.8 nm (½ of 773.6 nm referred to above). Next, the pulsed laser light after the wavelength conversion may be input to the second wavelength converter 92. The KBBF crystal of the second wavelength converter 92 may further convert the input pulsed laser light into the pulsed laser light 31 having a wavelength of approximately 193.4 nm (½ of 386.8 nm referred to above).

A traveling direction of the pulsed laser light 31 emitted from the wavelength converting device 9 may be changed by the high reflection mirror 11, in order to input the pulsed laser light 31 to the low coherence optical system 4. The coherence of the pulsed laser light 31 may be lowered by being transmitted through the low coherence optical system 4. The pulsed laser light 32 having the lowered coherence may be input to the amplifier device 3.

The power supply that is electrically connected to the anode 21 and the cathode 22 inside the chamber 20, may supply the discharge power to the anode 21 and the cathode 22. Hence, the discharge may be generated in the discharge space 23 between the anode 21 and the cathode 22.

A part of the pulsed laser light 32 emitted from the low coherence optical system 4 may be transmitted through the output coupling mirror 14 and reflected by the high reflection mirror 15. The reflected pulsed laser light 32 may be transmitted through the window 18 and travel to the discharge space 23 between the anode 21 and the cathode 22. The laser gas within the discharge space 23 may be excited by generating the discharge in the discharge space 23 when the pulsed laser light 32 exists within the discharge space 23. The pulsed laser light 32 passing through the discharge space 23 that includes the excited laser gas may be amplified. The amplified pulsed laser light 32 may be emitted from the chamber 20 through the window 19. The emitted pulsed laser light 32 may undergo high reflection at the high reflection mirrors 16 and 17, and again pass through the discharge space 23 within the chamber 20 through the window 19. In this case, the pulsed laser light 32 may be amplified. The pulsed laser light 32 may then be emitted from the chamber 20 through the window 18. The emitted pulsed laser light 32 may be incident on the output coupling mirror 14. A part of this pulsed laser light 32 may be transmitted through the output coupling mirror 14, and emitted from the amplifier device 3 as the pulsed laser light 33. Another part of the pulsed laser light 32 may be reflected by the output coupling mirror 14, returned again into the ring optical resonator, and amplified again.

The above description gives an example of the case in which the amplifier device 3 includes the ring optical resonator; however, the present disclosure is not limited to this example. For example, the amplifier device 3 may include a Fabry-Perot resonator in which an optical resonator is arranged in an amplifier.

The described example includes the wavelength converting device 9 of the solid state laser, and the laser system 1 using the wavelength converting device 9. However, the configuration of the low coherence optical system 4, the amplifier device 3, and the like illustrated in FIG. 1 may be replaced by another configuration. In addition, the pulsed laser light 31b before being subjected to the wavelength conversion by the wavelength converting device 9 may not necessarily be laser light output from a laser device including the Ti:sapphire laser 6.

4. Wavelength Converter Having Optical Element Arranged On At Least One Surface Side of Non-Linear Optical Crystal (First Embodiment)

Next, a detailed description will be given of a wavelength converter that may be used as the first wavelength converter 91 or the second wavelength converter 92 of the wavelength converting device 9 illustrated in FIG. 1, by referring to the drawings.

4.1 Configuration

Figure 3:
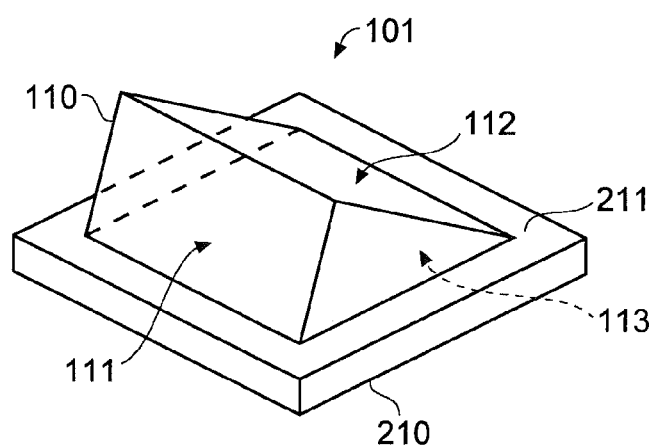
FIG. 3 is a perspective view schematically illustrating a configuration of a wavelength converter 101 in a first embodiment.

FIG. 3 is a perspective view schematically illustrating a configuration of a wavelength converter 101 in a first embodiment. As illustrated in FIG. 3, the wavelength converter 101 may include a prism 110 and a KBBF crystal 210. The crystal used in the wavelength converter 101 is not limited to the KBBF crystal 210, and another non-linear optical crystal, such as the LBO crystal or the BBO crystal, may be used. In addition, the KBBF crystal 210 is not limited to a single crystal, and may be formed by a KBBF stacked structure in which a plurality of crystals are stacked. Furthermore, another optical element may be used in place of the prism 110. In this case, the optical element may be formed to satisfy a condition that the laser light incident on the wavelength converter 101 is incident at a phase matching angle on the crystal 210 of KBBF or the like via the optical element.

The material forming the prism 110 may be synthetic silica glass, for example. In addition, materials such as $SiO_2$ crystal, fused quartz glass, $CaF_2$ crystal, or $MgF_2$ crystal may be used for the prism 110. Fluoride materials exhibiting a high resistance to ultraviolet laser light may preferably be used for the material forming the prism 110.

The prism 110 may be a right angle prism having a top surface and a bottom surface that are right-angled triangles, for example. In the description given hereinafter, amongst three side surfaces of this prism 110, the side surface including hypotenuses of the right-angled triangles forming the top and bottom surfaces may be referred to as a contact surface 113, for the sake of convenience. In addition, one of the two remaining side surfaces may be referred to as an incident surface 111, and the other of the two remaining side surfaces may be referred to as an emitting surface 112.

The incident surface 111 and the emitting surface 112 of the prism 110 may be coated with an AR (Anti-Reflective) film (AR coating) that reduces reflection of the pulsed laser light 31c.

The KBBF crystal 210 may be a non-linear optical crystal that is used as the wavelength converting element. The KBBF crystal 210 may be replaced by another non-linear optical crystal that is used as the wavelength converting element. The KBBF crystal 210 may be bonded to the prism 110 so that a crystal axis D1 is approximately perpendicular to the contact surface 113 of the prism 110. The crystal axis may be an axis at which the non-linear optical crystal indicates an approximately maximum second harmonic intensity.

The contact surface 113 of the prism 110 may be bonded to a contact surface 211 of the KBBF crystal 210. This bonding may be optical contact.

Figure 4:
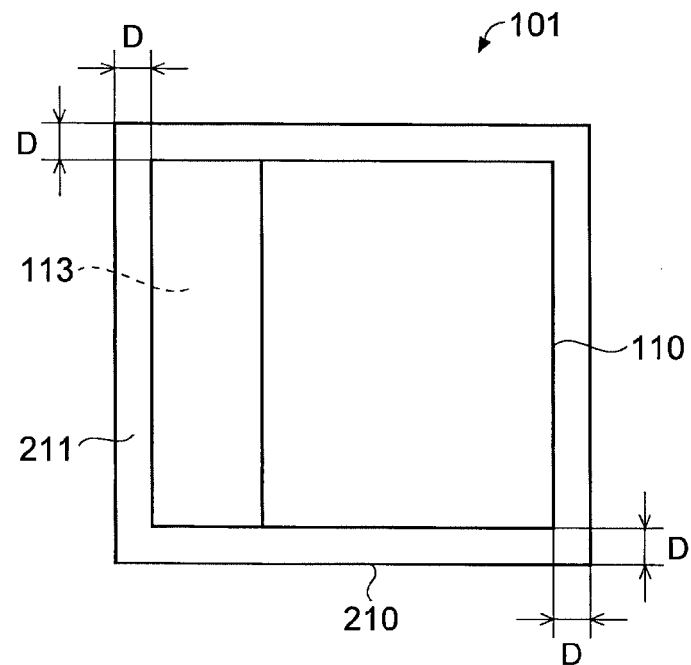
FIG. 4 is a top view illustrating the wavelength converter illustrated in FIG. 3 viewed from a mounting surface side of a KBBF crystal.

FIG. 4 is a top view illustrating the wavelength converter 101 illustrated in FIG. 3 viewed from the side of the contact surface 211 of the KBBF crystal 210. As illustrated in FIG. 4, the prism 110 may be bonded to the KBBF crystal 210 so that the contact surface 113 makes contact with a region at a distance D on an inner side from an outer periphery of the contact surface 211 of the KBBF crystal 210. The distance D may be at least greater than or equal to a width at which the profile irregularity of the KBBF crystal 210 deteriorates due to the cleavage and the like. This width may be the length from the end of the KBBF crystal 210. For example, the distance D may be 1 mm or greater. The distance D from the end of the contact surface 211 may not necessarily be constant for the entire outer periphery of the contact surface 113. A minimum of the distance D may be at least greater than or equal to the width (for example, 1 mm) at which the profile irregularity of the KBBF crystal 210 deteriorates due to the cleavage and the like. The distances at various locations illustrated in the examples in each of FIGS. 4 through 20 are all designated by the same reference character D; however, these distances may not necessarily be the same.

4.2 Operation

Figure 5:
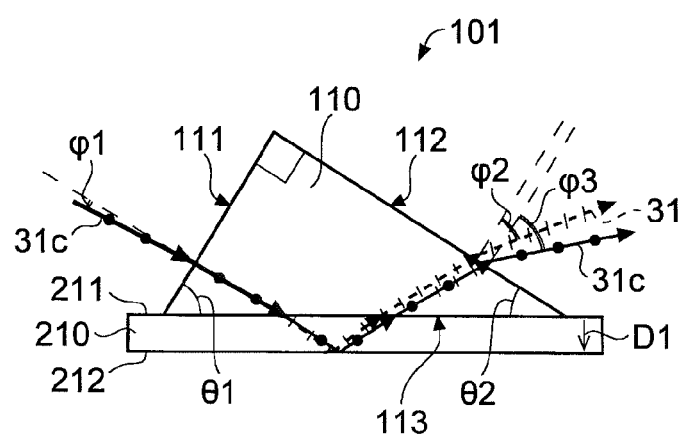
FIG. 5 is a cross sectional view illustrating the wavelength converter illustrated in FIG. 3 that is cut along a plane including an incident plane of laser light incident on the KBBF crystal.

FIG. 5 is a cross sectional view illustrating the wavelength converter 101 illustrated in FIG. 3 that is cut along a plane including an incident plane of the laser light incident on the KBBF crystal 210. As illustrated in FIG. 5, the pulsed laser light 31c may be incident on the incident surface 111 of the prism 110. The pulsed laser light 31c may be linearly polarized light having a polarization direction that is perpendicular to the incident plane of the KBBF crystal 210 (perpendicular to the drawing sheet in FIG. 5). The pulsed laser light 31c incident on the prism 110 may be transmitted through the prism 110, and thereafter be incident on the inside of the KBBF crystal 210 through the contact part between the KBBF crystal and the prism.

A part of the pulsed laser light 31c incident on the inside of the KBBF crystal 210 may be converted into the pulsed laser light 31 having a wavelength of 193.4 nm, for example, while propagating through the KBBF crystal 210. The wavelength-converted pulsed laser light 31 may be linearly polarized light having a polarization direction that is parallel to the incident plane of the KBBF crystal 210 (parallel to the drawing sheet in FIG. 5).

The converted pulsed laser light 31 and the remaining pulsed laser light 31c may undergo high reflection at a reflection surface 212 of the KBBF crystal 210, located on the opposite side from the contact surface 211 of the KBBF crystal 210. A region of the reflection surface 212, at least reflecting the pulsed laser light 31c and 31, may make contact with vacuum space or the air layer (or atmosphere). This may not exclude the entire reflection surface 212 making contact with the vacuum space or the air layer (or atmosphere).

The pulsed laser light 31c and 31 may be incident on the contact surface 211 between the KBBF crystal 210 and the prism, at an angle at which the pulsed laser 31c and 31 inside the KBBF crystal 210 may undergo high reflection at the reflection surface 212. The pulsed laser light 31c and 31 reflected by the reflection surface 212 may again propagate through the KBBF crystal 210. In this case, an optical path of the pulsed laser light 31c that is 2ω light and an optical path of the pulsed laser light 31 that is 4ω light may be separated depending on the difference between the refractive indexes with respect to the wavelength. A part of the pulsed laser light 31c after the reflection and propagating through the KBBF crystal 210 may be converted into the pulsed laser light 31.

Thereafter, the pulsed laser light 31c and 31 may again be incident on the prism 110 through the contact surface 113. In this case, the pulsed laser light 31c and 31 may be incident on the prism 110 via different optical paths. As a result, the pulsed laser light 31c and 31 may be emitted from the emitting surface 112 of the prism 110 via different optical paths.

For example, in a case in which the prism 110 is formed by a $CaF_2$ crystal, the refractive index of the crystal may be approximately 1.44. In this case, an angle of elevation, θ1, of the incident plane with respect to the contact surface 113 of the prism 110 may preferably be 58°, and an angle of elevation, θ2, of the emitting surface with respect to the contact surface 113 may preferably be 32°. When the pulsed laser 31c is incident on the incident surface 111 of the prism 110 at an incidence angle ø1 of 0.9°, both the pulsed laser light 31c and 31 may undergo high reflection or total reflection on the reflection surface 212 of the KBBF crystal 210. In addition, in this case, the pulsed laser light 31c after the reflection may be emitted from the emitting surface 112 of the prism 110 at an emission angle ø3 of 40.3°. The pulsed laser light 31 after the reflection may be emitted from the emitting surface 112 of the prism 110 at an emission angle ø2 of 30.2°.

4.3 Effects

According to the first embodiment, the KBBF crystal 210 and the prism 110 may be bonded in the region where the deterioration of the profile irregularity caused by the cleavage and the like of the non-linear crystal may be substantially ignored. For this reason, an optical contact having a high quality may be formed at the contact part between the KBBF crystal 210 and the prism 110. As a result, the wavelength converter 101 including the contact part having the high quality may be realized.

4.4 Variations of Optical Element

The optical element that may be combined with the KBBF crystal 210 is not limited to the right angle prism such as the prism 110. A description will hereinafter be given of variations of the optical element using several examples.

4.4.1 First Example

Figure 6:
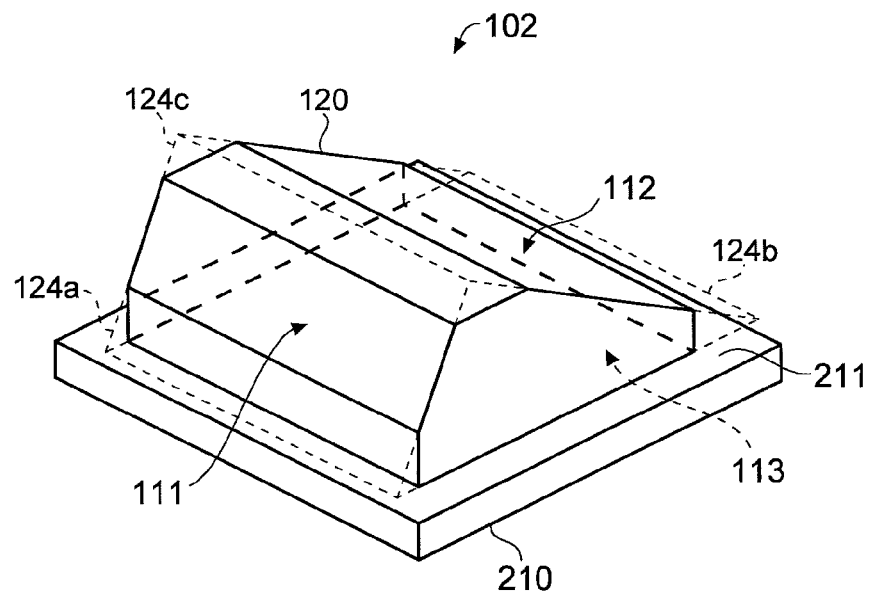
FIG. 6 is a perspective view schematically illustrating a configuration of the wavelength converter according to a first example of a variation of the wavelength converter in the first embodiment.
Figure 7:
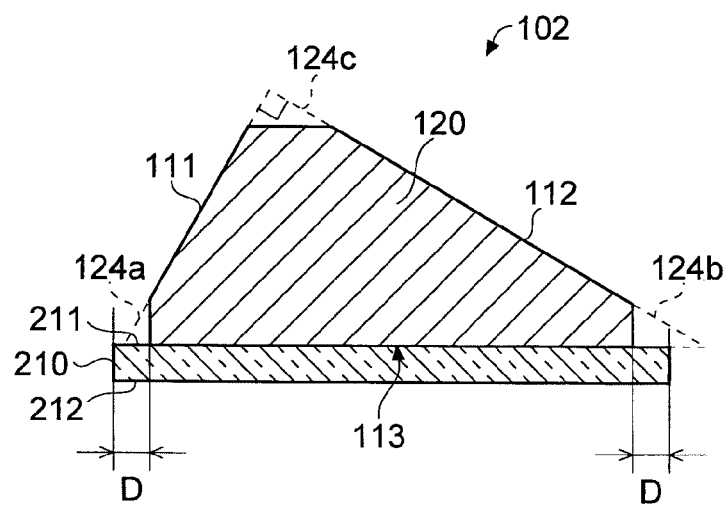
FIG. 7 is a cross sectional view illustrating the wavelength converter illustrated in FIG. 6 cut along a plane including an incident plane of the laser light to be incident on the KBBF crystal.

FIG. 6 is a perspective view schematically illustrating a configuration of a wavelength converter 102 according to a first example of the variation. FIG. 7 is a cross sectional view illustrating the wavelength converter 102 illustrated in FIG. 6 cut along a plane including an incident plane of the laser light to be incident on the KBBF crystal 210.

As illustrated in FIGS. 6 and 7, the optical element to be combined with the KBBF crystal 210 may be a prism 120 having a shape in which a part 124a that includes a corner where the incident surface 111 and the contact surface 113 intersect and a part 124b that includes a corner where the emitting surface 112 and the contact surface 113 intersect are removed. The parts that are removed by grinding are illustrated by dotted lines. Further, the prism 120 may have a shape in which a part 124c that includes a corner where the incident surface 111 and the emitting surface 112 intersect is removed. The part that is removed is illustrated by dotted lines.

The prism 120 may be bonded to the KBBF crystal 210 so that the contact surface 113 in the state in which there are no parts 124a and 124b makes contact with the contact surface 211 of the KBBF crystal 210 in the region at the distance D on the inner side from the outer periphery of the contact surface 211. The distance D may be similar to the distance D described with reference to FIG. 4.

4.4.2 Second Example

Figure 8:
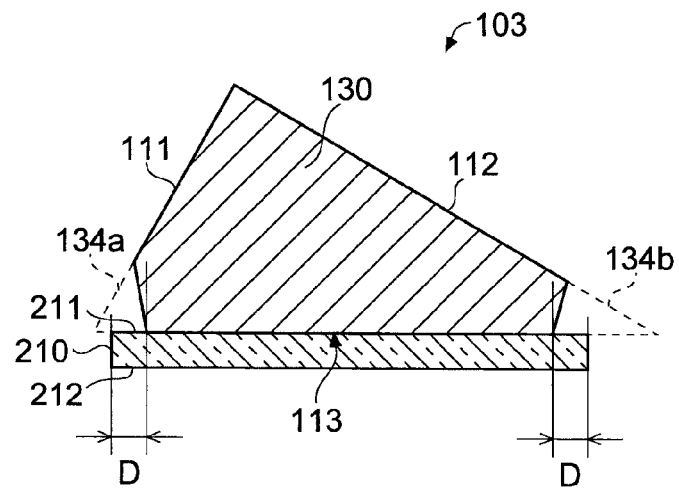
FIG. 8 is a cross sectional view illustrating the wavelength converter according to a second example of the variation of the wavelength converter in the first embodiment, cut along a plane including an incident plane of the laser light to be incident on the KBBF crystal.

FIG. 8 is a cross sectional view illustrating a wavelength converter 103 according to a second example of the variation, cut along a plane including an incident plane of the laser light to be incident on the KBBF crystal 210.

A surface that remains after a part 134a that includes a corner where the incident surface 111 and the contact surface 113 of a prism 130 intersect is removed, may not necessarily be perpendicular to the contact surface 113 (or the contact surface 211). This surface may be inclined by an obtuse angle as illustrated in the wavelength converter 103 in FIG. 8, for example, or may be inclined by an acute angle, with respect to the contact surface 113 (or the contact surface 211). Similarly, a surface that remains after a part 134b where the emitting surface 112 and the contact surface 113 of the prism 130 intersect is removed, may be inclined by an obtuse angle, or may be inclined by an acute angle, with respect to the contact surface 113 (or the contact surface 211).

The prism 130 may be bonded to the KBBF crystal 210 so that the contact surface 113 in the state in which there are no parts 134a and 134b makes contact with the contact surface 211 of the KBBF crystal 210 in the region at the distance D on the inner side from the outer periphery of the contact surface 211. The distance D may be similar to the distance D described with reference to FIG. 4.

4.4.3 Third Example

Figure 9:
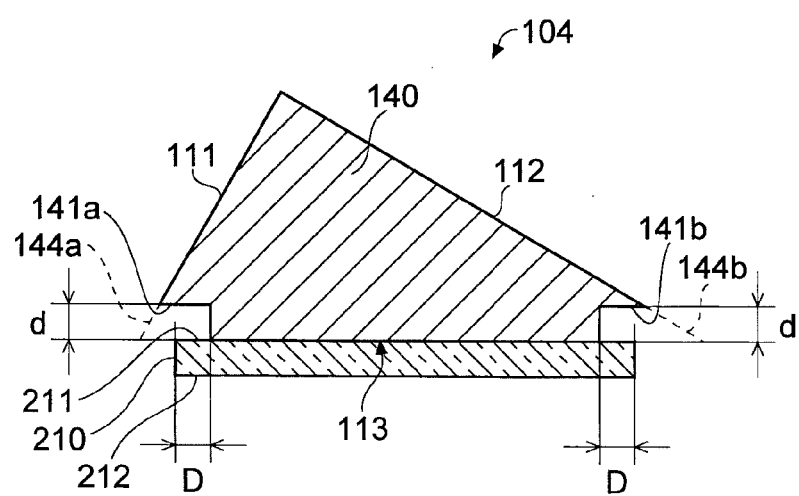
FIG. 9 is a cross sectional view illustrating the wavelength converter according to a third example of the variation of the wavelength converter in the first embodiment, cut along a plane including an incident plane of the laser light to be incident on the KBBF crystal.

FIG. 9 is a cross sectional view illustrating a wavelength converter 104 according to a third example of the variation, cut along a plane including an incident plane of the laser light to be incident on the KBBF crystal 210.

A prism 140 may have a shape illustrated in FIG. 9, in which a part 144a that includes a corner where the incident surface 111 and the contact surface 113 of the prism 140 intersect is removed. Similarly, the prism 140 may have a shape illustrated in FIG. 9, in which a part 144b that includes a corner where the emitting surface 112 and the contact surface 113 of the prism 140 intersect is removed.

A distance d between the contact surface 113 and a surface 141a that remains after the part 144a of the prism 140 is removed and does not make contact with the contact surface 113, may be greater than or equal to a height by which the end part of the KBBF crystal 210 builds up due to the cleavage. In other words, the distance d may be greater than or equal to a distance to the extent that may avoid the end part of the KBBF crystal 210 from making contact with the prism 140 even when the end part of the KBBF crystal 210 builds up due to the cleavage. Similarly, a distance d between the contact surface 113 and a surface 141b that remains after the part 144b of the prism 140 is removed and does not make contact with the contact surface 113, may be greater than or equal to a height by which the end part of the KBBF crystal 210 builds up due to the cleavage. It may be assumed that the contact surface 113 is a plane that does not include the build-up of the end part of the KBBF crystal 210 caused by the cleavage.

The prism 140 may be bonded to the KBBF crystal 210 so that the contact surface 113 in the state in which there are no parts 144a and 144b makes contact with the contact surface 211 of the KBBF crystal 210 in the region at the distance D on the inner side from the outer periphery of the contact surface 211. The distance D may be similar to the distance D described with reference to FIG. 4.

5. Wavelength Converter Having Optical Element Arranged On At Least One Surface Side of Non-Linear Optical Crystal With Intermediate Layer Interposed Between Optical Element and Non-Linear Optical Crystal (Second Embodiment)

Next, a detailed description will hereinafter be given of another example of the wavelength converter, by referring to the drawings.

5.1 Configuration

Figure 10:
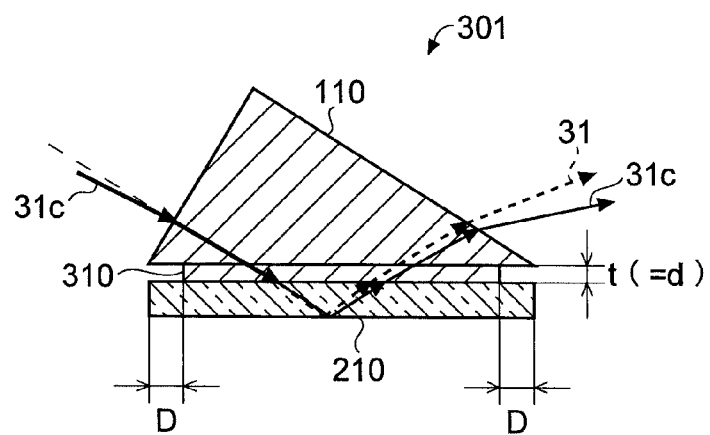
FIG. 10 schematically illustrates the configuration of the wavelength converter in a second embodiment.

FIG. 10 schematically illustrates the configuration of a wavelength converter 301 in a second embodiment. FIG. 10 illustrates a cross sectional view of the wavelength converter 301 cut along a plane including an incident plane of the laser light to be incident on the KBBF crystal 210.

As illustrated in FIG. 10, the wavelength converter 301 may include an intermediate layer 310, in addition to the prism 110 and the KBBF crystal 210. The prism 110 and the KBBF crystal 210 may be similar to the prism 110 (including the variations thereof) and the KBBF crystal 210 of the first embodiment described above.

The intermediate layer 310 may be a plate-shaped member, a film-shaped member, or the like. The material forming the intermediate layer 310 may be synthetic silica glass, for example. In addition, materials such as $SiO_2$ crystal, fused quartz glass, $CaF_2$ crystal, or $MgF_2$ crystal may be used for the intermediate layer 310. Fluoride materials exhibiting a high resistance to ultraviolet laser light may preferably be used for the material forming the intermediate layer 310.

In addition, the refractive index of the intermediate layer 130 may be equal to the refractive index of the prism 110. However, this is not a limitation. For example, when making the refractive index of the intermediate layer 310 equal to the refractive index of the prism 110, the material used for the intermediate layer 310 may be the same as the material used for the prism 110.

The intermediate layer 310 and the prism 110 may be bonded by optical contact. Similarly, the intermediate layer 310 and the KBBF crystal 210 may be bonded by optical contact.

The intermediate layer 310 may be bonded to the KBBF crystal 210 so that the intermediate layer 310 makes contact with the contact surface 211 of the KBBF crystal 210 in the region at a distance D on the inner side from the outer periphery of the contact surface 211, in a manner similar to the prism 110 of the first embodiment. On the other hand, the size of the contact surface 113 of the prism 110 making contact with the intermediate layer 310 may be larger than or smaller than the size of the surface of the intermediate layer 310 opposing the prism 110. In addition, the size and shape of the contact surface 113 may or may not match the size and shape of the surface of the intermediate layer 310 opposing the prism 110. When the size and shape of the contact surface 113 match the size and shape of the surface of the intermediate layer 310 opposing the prism 110, the positions of the prism and the intermediate layer 310 may or may not be aligned before contact is made.

A thickness t of the intermediate layer 310, that is, a distance d between the contact surface 113 of the prism 110 and the contact surface 211, may be greater than or equal to the height by which the end part of the KBBF crystal 210 builds up due to the cleavage. In other words, the thickness t (=distance d) may be greater than or equal to a distance to the extent that may avoid the end part of the KBBF crystal 210 from making contact with the prism 110 even when the end part of the KBBF crystal 210 builds up after the cleavage.

5.2 Operation

The operation of the wavelength converter 301 may be similar to the operation of the wavelength converter 101 of the first embodiment described above. However, as illustrated in FIG. 10, the pulsed laser light 31c incident on the prism 110 may be incident on the KBBF crystal 210 via the intermediate layer 310. In addition, the pulsed laser light 31 and 31c reflected by the reflection surface 212 may be incident again on the prism 110 via the intermediate layer 310. Thereafter, the pulsed laser light 31 and 31c may be emitted from the emitting surface 112 of the prism 110 via different optical paths.

5.3 Effects

According to the second embodiment, the KBBF crystal 210 and the intermediate layer 310 may be bonded in the region where the deterioration of the profile irregularity caused by the cleavage and the like may be substantially ignored. For this reason, an optical contact having a high quality may be formed at the contact part between the KBBF crystal 210 and the intermediate layer 310. Further, because the prism 110 may be bonded to the intermediate layer 310 whose surface smoothness is maintained, an optical contact having a high quality may be formed at the contact part between the prism 110 and the intermediate layer 310. As a result, the wavelength converter 310 including the contact parts having the high quality may be realized.

6. Wavelength Converter Having Optical Element On Each of At Least Two Surface Sides of Non-Linear Optical Crystal (Third Embodiment)

Next, a detailed description will hereinafter be given of another example of the wavelength converter, by referring to the drawings.

6.1 Configuration

Figure 11:
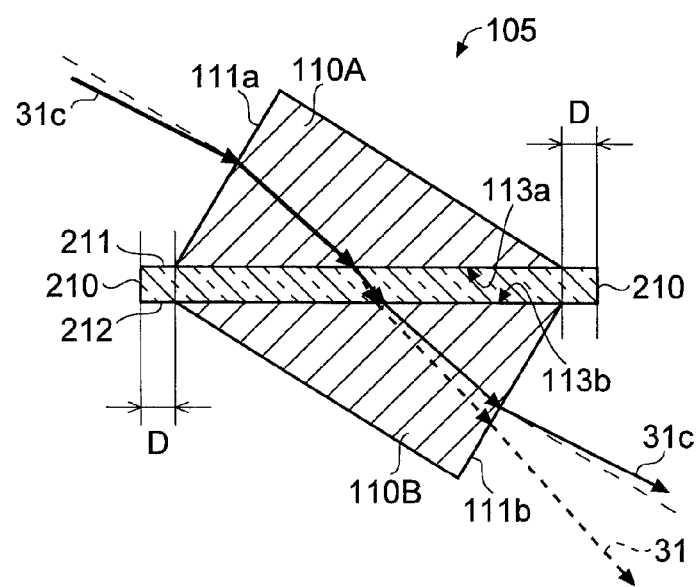
FIG. 11 schematically illustrates the configuration of the wavelength converter in a third embodiment.

FIG. 11 schematically illustrates the configuration of a wavelength converter 105 in a third embodiment. FIG. 11 illustrates a cross sectional view of the wavelength converter 105 cut along a plane including an incident plane of the laser light to be incident on the KBBF crystal 210.

As illustrated in FIG. 11, the wavelength converter 105 may include two prisms 110A and 110B, and the KBBF crystal 210. Each of the prisms 110A and 110B and the KBBF crystal 210 may be similar to the prism 110 (including the variations thereof) and the KBBF crystal 210 of the first embodiment described above.

The incident side prism 110A may be bonded to the KBBF crystal 210 so that a contact surface 113a makes contact with a region at a distance D on the inner side from the outer periphery of a first contact surface 211 of the KBBF crystal 210, in a manner similar to the prism 110. Similarly, the emitting side prism 110B may be bonded to the KBBF crystal 210 so that a contact surface 113b makes contact with a region at a distance D on the inner side from the outer periphery of a second contact surface 212 of the KBBF crystal 210. In this case, the contact surface 113a of the prism 110A and the contact surface 113b of the prism 110B may be mutually parallel. In this case, a surface 111b of the prism 110B corresponding to an incident surface 111a of the prism 110A may function as an emitting surface of the pulsed laser light 31 after the wavelength conversion and the remaining pulsed laser light 31c (the surface 111b will hereinafter be referred to as the emitting surface).

6.2 Operation

The operation of the wavelength converter 105 may be similar to the operation of the wavelength converter 101 of the first embodiment described above. However, as illustrated in FIG. 11, the pulsed laser light 31 subjected to the wavelength conversion by the KBBF crystal 210 and the remaining pulsed laser light 31c may be incident on the prism 110B via the second contact surface 212 of the KBBF crystal 210. Thereafter, the pulsed laser light 31 and 31c may be emitted from the emitting surface 111b of the prism 110B via different optical paths, respectively.

6.3 Effects

According to the third embodiment, the KBBF crystal 210 and the prisms 110A and 110B may be bonded in the regions where the deterioration of the profile irregularity caused by the cleavage and the like may be substantially ignored, as in the case of the first embodiment. For this reason, an optical contact having a high quality may be formed at the contact part between the KBBF crystal 210 and prism 110A and at the contact part between the KBBF crystal 210 and the prism 110B. As a result, the wavelength converter 105 including the contact parts having the high quality may be realized.

7. Wavelength Converter Having Optical Element On Each of At Least Two Surface Sides of Non-Linear Optical Crystal With Intermediate Layer Interposed Between Each Optical Element and Non-Linear Optical Crystal (Fourth Embodiment)

In addition, the wavelength converter 301 illustrated in FIG. 10 may be applied to the wavelength converter 105 illustrated in FIG. 11. A detailed description will be given of an example in which the wavelength converter 301 is applied to the wavelength converter 105, as a fourth embodiment, by referring to the drawings.

7.1 Configuration

Figure 12:
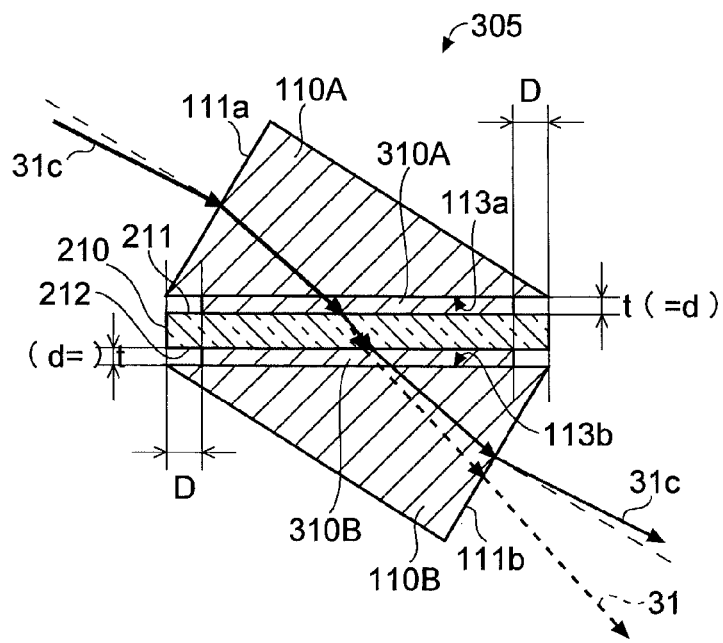
FIG. 12 schematically illustrates the configuration of the wavelength converter in a fourth embodiment.

FIG. 12 schematically illustrates the configuration of a wavelength converter 305 in the fourth embodiment. FIG. 12 illustrates a cross sectional view of the wavelength converter 305 cut along a plane including an incident plane of the laser light to be incident on the KBBF crystal 210.

As illustrated in FIG. 12, the wavelength converter 305 may include two intermediate layers 310A and 310B, in addition to the two prisms 110A and 110B and the KBBF crystal 210. Each of the prisms 110A and 110B and the KBBF crystal 210, and each of the intermediate layers 310A and 310B may be similar to the prism 110, the KBBF crystal 210, and the intermediate layer 310 of the second embodiment described above.

The intermediate layer 310A may be interposed between the incident side prism 110A and the KBBF crystal 210. The intermediate layer 310B may be interposed between the emitting side prism 110B and the KBBF crystal 210. A structure part formed by the prism 110A, the intermediate layer 310A, and the KBBF crystal 210 may be similar to the wavelength converter 301 illustrated in FIG. 10. Similarly, a structure part formed by the prism 110B, the intermediate layer 310B, and the KBBF crystal 210 may be similar to the wavelength converter 301 illustrated in FIG. 10. In this case, the prism 110A and the prism 110B may be oriented so that the prisms 110A and 110B face mutually opposite directions.

7.2 Operation

The operation of the wavelength converter 305 may be similar to the operation of the wavelength converter 105 of the third embodiment described above. However, as illustrated in FIG. 12, the pulsed laser light 31c incident on the prism 110A may be incident on the KBBF crystal 210 via the intermediate layer 310A. In addition, the pulsed laser light 31 and 31c emitted from the KBBF crystal 210 may be incident on the prism 110B via the intermediate layer 310B. Thereafter, the pulsed laser light 31 and 31c may be emitted from the emitting surface 111b of the prism 110B via different optical paths, respectively.

7.3 Effects

According to the fourth embodiment, the KBBF crystal 210 and the intermediate layers 310A and 310B may be bonded in regions where the deterioration of the profile irregularity caused by the cleavage and the like may be substantially ignored, as in the case of the second embodiment. For this reason, an optical contact having a high quality may be formed at the contact part between the KBBF crystal 210 and the intermediate layer 310A and at the contact part between the KBBF crystal 210 and the intermediate layer 310B. Further, because the prisms 110A and 110B may respectively be bonded to the intermediate layers 310A and 310B in which better surface smoothness than the KBBF crystal 210 is maintained, an optical contact having a high quality may be formed at the contact part between the prism 110A and the intermediate layer 310A and at the contact part between the prism 110B and the intermediate layer 310B. As a result, the wavelength converter 305 including the contact parts having the high quality may be realized.

8. Wavelength Converter Having At Least Two Non-Linear Optical Crystals

In addition, the number of non-linear optical crystals used in the wavelength converter is not limited to one, and may be two or more. A detailed description will hereinafter be given of the wavelength converter using two non-linear optical crystals, by referring to the drawings.

8.1 Case in which Non-Linear Optical Crystals Mutually Form Optical Contact (Fifth Embodiment)

First, a detailed description will be given of a case in which the non-linear optical crystals mutually form the optical contact, as a fifth embodiment, by referring to the drawings.

8.1.1 Configuration

Figure 13:
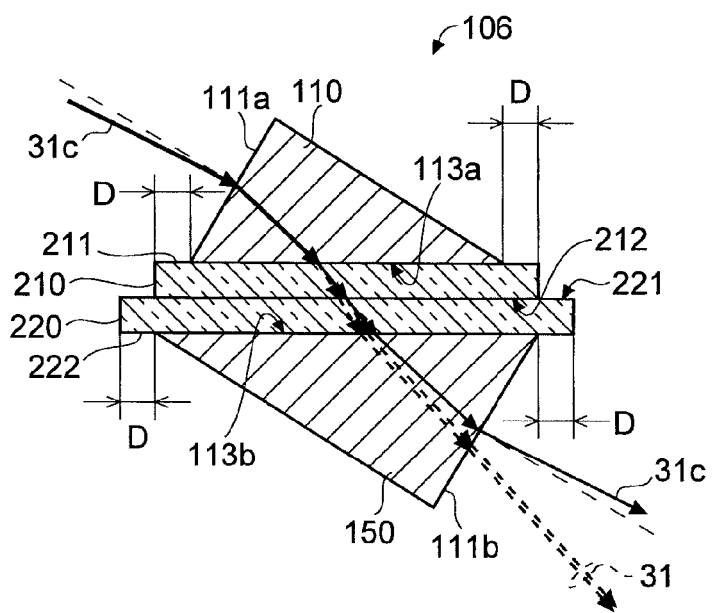
FIG. 13 schematically illustrates the configuration of the wavelength converter in a fifth embodiment.

FIG. 13 schematically illustrates the configuration of a wavelength converter 106 in the fifth embodiment. FIG. 13 illustrates a cross sectional view of the wavelength converter 106 cut along a plane including an incident plane of the laser light to be incident on the KBBF crystal 210.

As illustrated in FIG. 13, the wavelength converter 106 may include two prisms 110 and 150, and two KBBF crystals 210 and 220. Each of the prisms 110 and 150 and each of the KBBF crystals 210 and 220 may be similar to the prism 110 (including the variations thereof) and the KBBF crystal 210 of the first embodiment described above. However, the size of a contact surface 221 of the KBBF crystal 220 may be larger than the size of the contact surface 212 of the KBBF crystal 210.

The incident side prism 110 may be bonded to the KBBF crystal 210 so that the contact surface 113a makes contact with the region at the distance D on the inner side from the outer periphery of the contact surface 211 of the KBBF crystal 210. On the other hand, the emitting side prism 150 may be bonded to the KBBF crystal 220 so that the contact surface 113b makes contact with a region at the distance D on an inner side from an outer periphery of a contact surface 222 of the KBBF crystal 220. In this case, the prism 110 and the prism 150 may be oriented so that the prisms 110 and 150 face mutually opposite directions, as in the case of the third embodiment described above.

The KBBF crystal 210 may be bonded to the KBBF crystal 220 so that the contact surface 212 makes contact with a region at the distance D on an inner side from an outer periphery of the contact surface 221 of the KBBF crystal 220. The bonding in this case may be optical contact.

8.1.2 Operation

The operation of the wavelength converter 106 may be similar to the operation of the wavelength converter 105 of the fourth embodiment described above. However, as illustrated in FIG. 13, the pulsed laser light 31 subjected to the wavelength conversion by the KBBF crystal 210 and the remaining pulsed laser light 31c may next be incident on the KBBF crystal 220. Of the pulsed laser light 31 and 31c incident on the KBBF crystal 220, a part of the pulsed laser light 31c may be converted into the pulsed laser light 31 while propagating through the KBBF crystal 220. Thereafter, the pulsed laser light 31 and 31c propagating through the KBBF crystal 220 may be incident on the prism 150 via the contact surface 222 of the KBBF crystal 220. Thereafter, the pulsed laser light 31 and 31c may be emitted from the emitting surface 111b of the prism 150 via different optical paths, respectively.

8.1.3 Effects

According to the fifth embodiment, the KBBF crystal 210 and the prism 110, the KBBF crystal 220 and the prism 150, and the KBBF crystals 210 and 220 may be bonded in the regions where the deterioration of the profile irregularity caused by the cleavage and the like may be substantially ignored, as in the case of the third embodiment. For this reason, an optical contact having a high quality may be formed at the contact part between the KBBF crystal 210 and the prism 110, between the KBBF crystal 220 and the prism 150, and between the KBBF crystals 210 and 220. As a result, the wavelength converter 106 including the contact parts having the high quality may be realized. In addition, by employing the stacked structure formed by the plurality of KBBF crystals 210 and 220, the conversion efficiency of the conversion from the pulsed laser light 31c to the pulsed laser light 31 may be improved. As a result, the pulsed laser light 31 having a higher intensity may be obtained. In this case, at the end part of the contact surface 212 of the KBBF crystal 210, the region where the deterioration of the profile irregularity caused by the cleavage and the like may be substantially ignored may not necessarily make contact with the contact surface 221. Even in such a case, it may be sufficient for the wavelength converter 106 as a whole to be able to substantially ignore the deterioration of the profile irregularity caused by the cleavage and the like.

8.1.4 Modification

Figure 14:
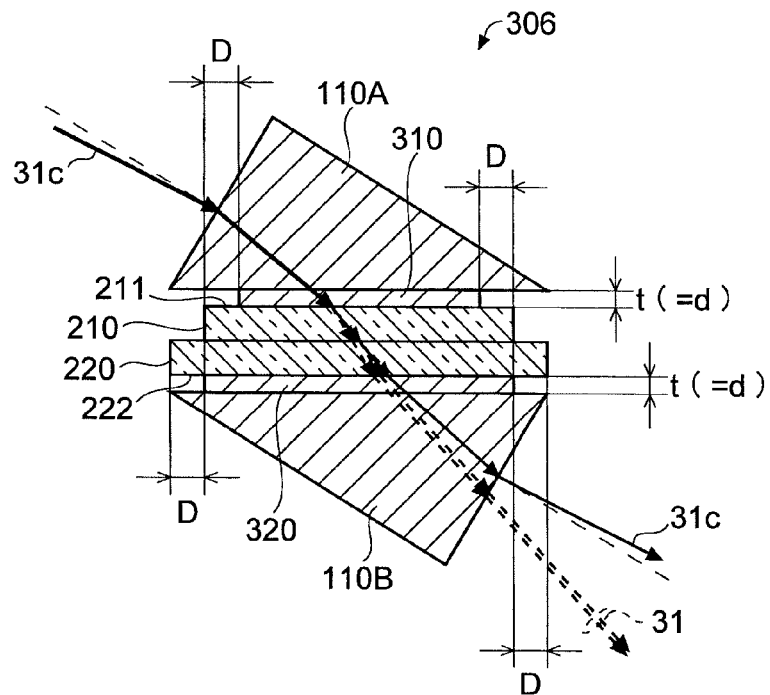
FIG. 14 schematically illustrates the configuration of the wavelength converter in a modification of the fifth embodiment.

In addition, the wavelength converter 301 illustrated in FIG. 10 may be applied to the wavelength converter 106 illustrated in FIG. 13, as in the case of the wavelength converter 305 of the fourth embodiment. FIG. 14 schematically illustrates a configuration of a wavelength converter 306 having the configuration in which the wavelength converter 301 is applied to the wavelength converter 106. However, in FIG. 14, the prisms 110A and 110B may be used in place of the prisms 110 and 150.

As illustrated in FIG. 14, the wavelength converter 306 may have a configuration including the intermediate layer 310 arranged between the prism 110A and the KBBF crystal 210, and an intermediate layer 320 arranged between the prism 110B and the KBBF crystal 220. Each of the intermediate layers 310 and 320 may be similar to the intermediate layer 310 of the second embodiment described above. However, the sizes of the intermediate layers 310 and 320 may be appropriately modified depending on the shapes of the contact surface 211 of the KBBF crystal 210 and the contact surface 222 of the KBBF crystal 220 so that the deterioration of the profile irregularity caused by the cleavage and the like may be substantially ignored.

In addition, in this modification, the prisms 110A and 110B may not necessarily make direct contact with the KBBF crystals 210 and 220, respectively. For this reason, the sizes of the prisms 110A and 110B may be appropriately modified regardless of the sizes of the contact surfaces 211 and 222 of the KBBF crystals 210 and 220.

8.2 Case In Which Intermediate Layer Is Arranged Between Non-Linear Optical Elements (Sixth Embodiment)

Next, a description will be given of a case in which the non-linear optical crystals mutually do not make direct contact, as a sixth embodiment, by referring to the drawings.

8.2.1 Configuration

Figure 15:
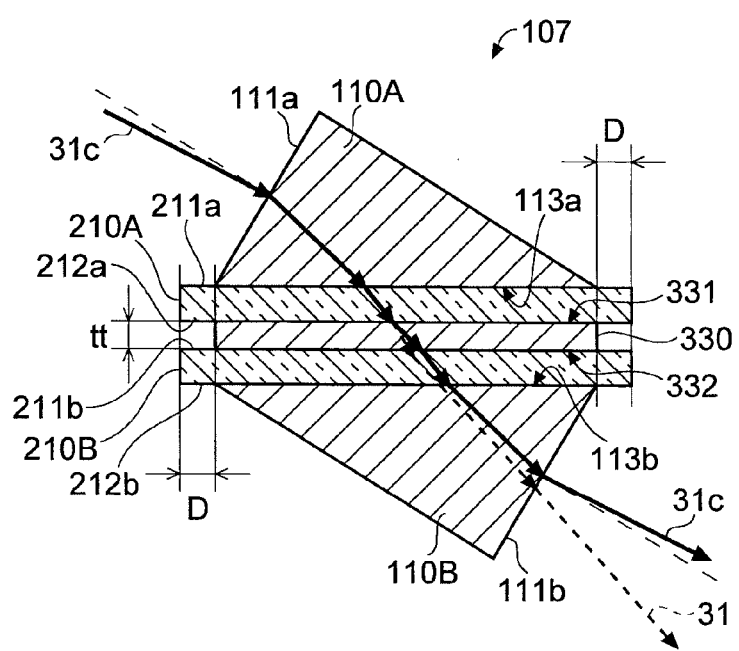
FIG. 15 schematically illustrates the configuration of the wavelength converter in a sixth embodiment.

FIG. 15 schematically illustrates the configuration of a wavelength converter 107 in the sixth embodiment. FIG. 15 illustrates a cross sectional view of the wavelength converter 107 cut along a plane including an incident plane of the laser light to be incident on a KBBF crystal 210A.

As illustrated in FIG. 15, the wavelength converter 107 may include an intermediate layer 330, in addition to the two prisms 110A and 110B and two KBBF crystals 210A and 210B. Each of the prisms 110A and 110B and each of the KBBF crystals 210A and 210B may be similar to the prism 110 (including the variations thereof) and the KBBF crystal 210 of the first embodiment described above. In addition, the intermediate layer 330 may be similar to the intermediate layer 310 of the second embodiment described above. However, a thickness tt of the intermediate layer 330 may be greater than or equal to a sum of heights by which the end parts of the KBBF crystals 210A and 210B build up after the cleavage.

A structure part formed by the prism 110A and the KBBF crystal 210A, and a structure part formed by the prism 110B and the KBBF crystal 210B may be similar to the wavelength converter 101 illustrated in FIG. 5, respectively. In this case, the prism 110A and the prism 110B may be oriented so that the prisms 110A and 110B face mutually opposite directions.

The intermediate layer 330 may be bonded to each of the KBBF crystals 210A and 210B so that the contact surfaces 331 and 332 make contact with the regions at the distance D on the inner side from the outer periphery of the contact surfaces 331 and 332 of the KBBF crystals 210A and 210B, respectively.

8.2.2 Operation

The operation of the wavelength converter 107 may be similar to the operation of the wavelength converter 106 described above. However, as illustrated in FIG. 15, the pulsed laser light 31 subjected to the wavelength conversion by the KBBF crystal 210A and the remaining pulsed laser light 31c may be incident on the KBBF crystal 210B via the intermediate layer 330. Of the pulsed laser light 31 and 31c incident on the KBBF crystal 210B, a part of the pulsed laser light 31c may be converted into the pulsed laser light 31 while propagating through the KBBF crystal 210B. Thereafter, the pulsed laser light 31 and 31c propagating through the KBBF crystal 210B may be incident on the prism 110B via a contact surface 212b of the KBBF crystal 210B. Thereafter, the pulsed laser light 31 and 31c may be emitted from the emitting surface 111b of the prism 110B via different optical paths, respectively.

8.2.3 Effects

According to the sixth embodiment, the KBBF crystal 210A and the prism 110A, the KBBF crystal 210B and the prism 110B, the KBBF crystal 210A and the intermediate layer 330, and the KBBF crystal 210B and the intermediate layer 330 may be bonded in the regions where the deterioration of the profile irregularity caused by the cleavage and the like may be substantially ignored, as in the case of the fifth embodiment. For this reason, an optical contact having a high quality may be formed at the contact part between the KBBF crystal 210A and the prism 110A, between the KBBF crystal 210B and the prism 110B, between the KBBF crystal 210A and the intermediate layer 330, and between the KBBF crystal 210B and the intermediate layer 330. As a result, the wavelength converter 107 including the contact parts having the high quality may be realized. In addition, by employing the stacked structure formed by the plurality of KBBF crystals 210A and 210B, the conversion efficiency of the conversion from the pulsed laser light 31c to the pulsed laser light 31 may be improved. As a result, the pulsed laser light 31 having a higher intensity may be obtained.

8.2.4 Modification

Figure 16:
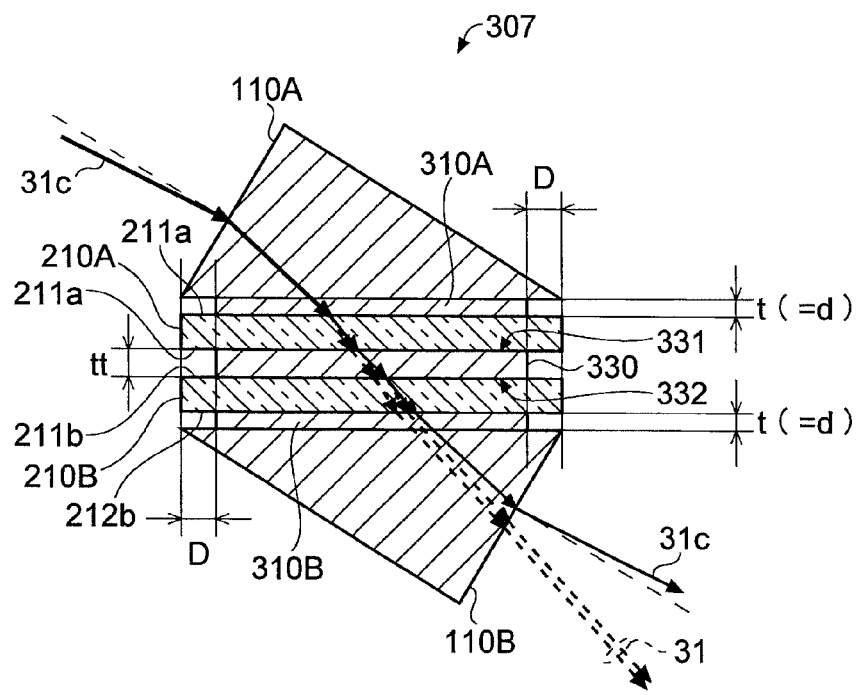
FIG. 16 schematically illustrates the configuration of the wavelength converter in a modification of the sixth embodiment.

In addition, the wavelength converter 301 illustrated in FIG. 10 may be applied to the wavelength converter 107 illustrated in FIG. 15, as in the case of the wavelength converter 306 of the modification of the fifth embodiment. FIG. 16 schematically illustrates a configuration of a wavelength converter 307 having the configuration in which the wavelength converter 301 is applied to the wavelength converter 107.

As illustrated in FIG. 16, the wavelength converter 307 may have a configuration including an intermediate layer 310A arranged between the prism 110A and the KBBF crystal 210A, and an intermediate layer 310B arranged between the prism 110B and the KBBF crystal 210B. Further, an intermediate layer 330 may be arranged between the KBBF crystal 210A and the KBBF crystal 210B. The intermediate layers 310A, 310B, and 330 may be similar to the intermediate layer 310 of the second embodiment described above.

In addition, in this modification, the prisms 110A and 110B may not make direct contact with the KBBF crystals 210A and 210B, respectively. For this reason, the sizes of the prisms 110A and 110B may be appropriately modified, regardless of the sizes of contact surfaces 211a and 212b of the KBBF crystals 210A and 210B.

9. Wavelength Converter In which Optical Path of Light Within Non-Linear Optical Crystal Returns Two Or More Times (Seventh Embodiment)

In addition, in the examples using two prisms in the embodiment described above, the pulsed laser light 31c and 31 pass through each KBBF crystal without being returned in the illustrated examples. However, the present disclosure is not limited to such examples. For example, the optical paths of the pulsed laser light 31c and 31 may be returned one or more times within the wavelength converting element (KBBF crystal). A detailed description will hereinafter be given of a wavelength converter having a configuration in which the optical paths of the pulsed laser light 31c and 31 return two times within the KBBF crystal, as a seventh embodiment, by referring to the drawings.

9.1 Configuration

Figure 17:
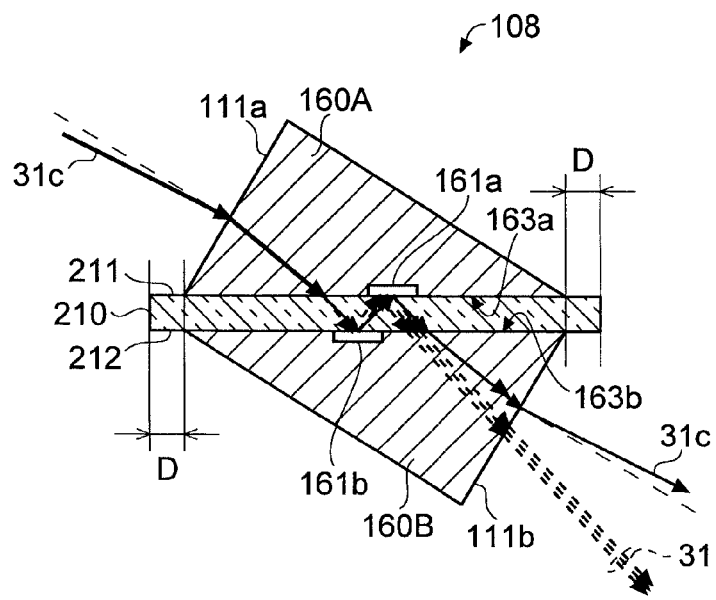
FIG. 17 schematically illustrates the configuration of the wavelength converter in a seventh embodiment.

FIG. 17 schematically illustrates the configuration of a wavelength converter 108 in the seventh embodiment. FIG. 17 illustrates a cross sectional view of the wavelength converter 108 cut along a plane including an incident plane of the laser light to be incident on the KBBF crystal 210.

As illustrated in FIG. 17, the wavelength converter 108 may include two prisms 160A and 160B, and the KBBF crystal 210. Each of the prisms 160A and 160B and the KBBF crystal 210 may be similar to the prism 110 (including the variations thereof) and the KBBF crystal 210 of the first embodiment described above. However, the prisms 160A and 161B may include grooves 161a and 161b formed in contact surfaces 163a and 163b, respectively.

The groove 161b of the emitting side prism 160B may be positioned in a region along a traveling direction of the pulsed laser light 31c incident on the KBBF crystal 210 via the incident side prism 160A, and the pulsed laser light 31 generated by subjecting a part of the pulsed laser light 31c to a wavelength conversion, in the contact surface 163b with respect to the KBBF crystal 210. In a state in which the prism 160B and the KBBF crystal 210 form an optical contact, the inside of the groove 161b may be an air layer.

On the other hand, the groove 161a of the incident side prism 160A may be positioned in a region along a traveling direction of the pulsed laser light 31c and 31 reflected by a second contact surface 212 of the KBBF crystal 210, in the contact surface 163a with respect to the KBBF crystal 210. In a state in which the prism 160A and the KBBF crystal 210 form an optical contact, the inside of the groove 161a may be an air layer.

9.2 Operation

The operation of the wavelength converter 108 may be similar to the operation of the wavelength converter 105 of the third embodiment described above. However, as illustrated in FIG. 17, the pulsed laser light 31c incident on the KBBF crystal 210 via the incident side prism 160A and the pulsed laser light 31 may undergo high reflection or total reflection in a region where the second contact surface 212 of the KBBF crystal 210 makes contact with the air layer inside the groove 161b. Of the reflected pulsed laser light 31c and 31, a part of the pulsed laser light 31c may be converted into the pulsed laser light 31 while again propagating through the KBBF crystal 210. Next, the pulsed laser light 31c and 31 propagating through the KBBF crystal 210 may again undergo high reflection or total reflection in a region where a first contact surface 211 of the KBBF crystal 210 makes contact with the air layer inside the groove 161a. Of the reflected pulsed laser light 31c and 31, a part of the pulsed laser light 31c may be converted into the pulsed laser light 31 while again propagating through the KBBF crystal 210. Next, the pulsed laser light 31 and 31c propagating through the KBBF crystal 210 may be incident on the prism 110B via the second contact surface 212 of the KBBF crystal 210. Thereafter, the pulsed laser light 31 and 31c may be emitted from the emitting surface 111b of the prism 110B via different optical paths, respectively.

9.3 Effects

According to the seventh embodiment, the KBBF crystal 210 and the prisms 110A and 110B may be bonded in the regions where the deterioration of the profile irregularity caused by the cleavage and the like may be substantially ignored, as in the case of the third embodiment. For this reason, an optical contact having a high quality may be formed at the contact part between the KBBF crystal 210 and prism 110A and at the contact part between the KBBF crystal 210 and the prism 110B. As a result, the wavelength converter 108 including the contact parts having the high quality may be realized.

In addition, by employing a configuration in which the pulsed laser light 31c passes through the KBBF crystal 210 a plurality of times (three times in this example), the conversion efficiency of the conversion from the pulsed laser light 31c to the pulsed laser light 31 may be improved. As a result, the pulsed laser light 31 having a higher intensity may be obtained.

9.4 Modification

Figure 18:
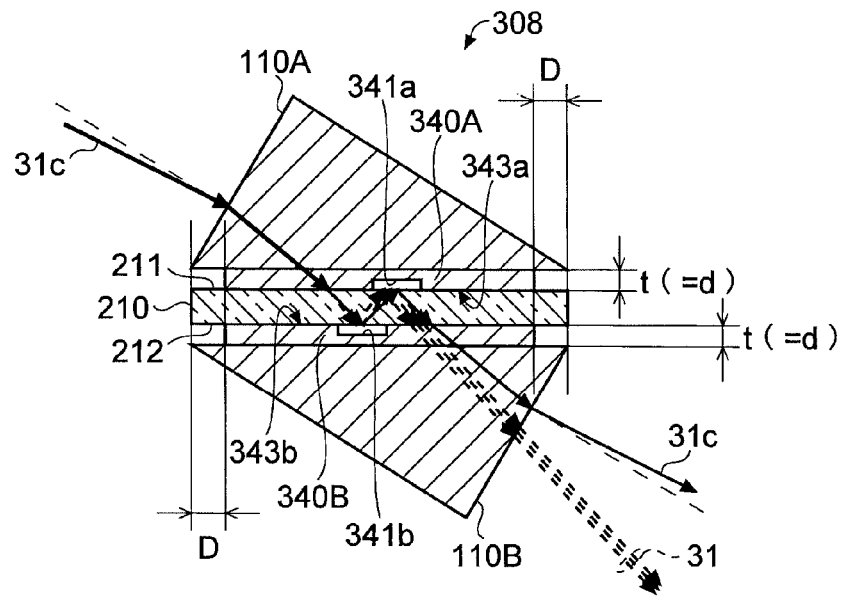
FIG. 18 schematically illustrates the configuration of the wavelength converter in a modification of the seventh embodiment.

In addition, the wavelength converter 301 illustrated in FIG. 10 may be applied to the wavelength converter 108 illustrated in FIG. 17, as in the case of the wavelength converter 305 of the fourth embodiment. FIG. 18 schematically illustrates a configuration of a wavelength converter 308 having the configuration in which the wavelength converter 301 is applied to the wavelength converter 108. However, in FIG. 18, the prisms 110A and 110B may be used in place of the prisms 160A and 160B.

As illustrated in FIG. 18, the wavelength converter 308 may have a configuration including an intermediate layer 340A arranged between the prism 110A and the KBBF crystal 210, and an intermediate layer 340B arranged between the prism 110B and the KBBF crystal 210. Each of the intermediate layers 340A and 340B may be similar to the intermediate layer 310 of the second embodiment described above. However, each of the intermediate layers 340A and 340B may include grooves 341a and 341b formed in contact surfaces 343a and 343b that make contact with the KBBF crystal 310, respectively.

The groove 341b of the intermediate layer 340B arranged between the emitting side prism 110B and the KBBF crystal 210 may be positioned in a region along a traveling direction of the pulsed laser light 31c incident on the KBBF crystal 210 via the incident side prism 110A and the intermediate layer 340A, and the pulsed laser light 31, in the contact surface 343b with respect to the KBBF crystal 210. In a state in which the KBBF crystal 210 and the intermediate layer 340B form an optical contact, the inside of the groove 341b may be an air layer.

On the other hand, the groove 341a of the intermediate layer 340A arranged between the incident side prism 110A and the KBBF crystal 210 may be positioned in a region along a traveling direction of the pulsed laser light 31c and 31 reflected by the second contact surface 212 of the KBBF crystal 210, in the contact surface 343a with respect to the KBBF crystal 210. In a state in which the KBBF crystal 210 and the intermediate layer 340A form an optical contact, the inside of the groove 341a may be an air layer.

10. Holder for Wavelength Converter Having Configuration in Which Non-Linear Optical Element is Interposed Between Two Optical Elements (Eighth Embodiment)

Next, a description will be given of a holder for the wavelength converter, by referring to examples. The following gives examples of the holder that holds the wavelength converter having a configuration in which the KBBF crystal is sandwiched between two prisms, in a state in which pressure is applied on the wavelength converter.

10.1 Configuration

Figure 19:
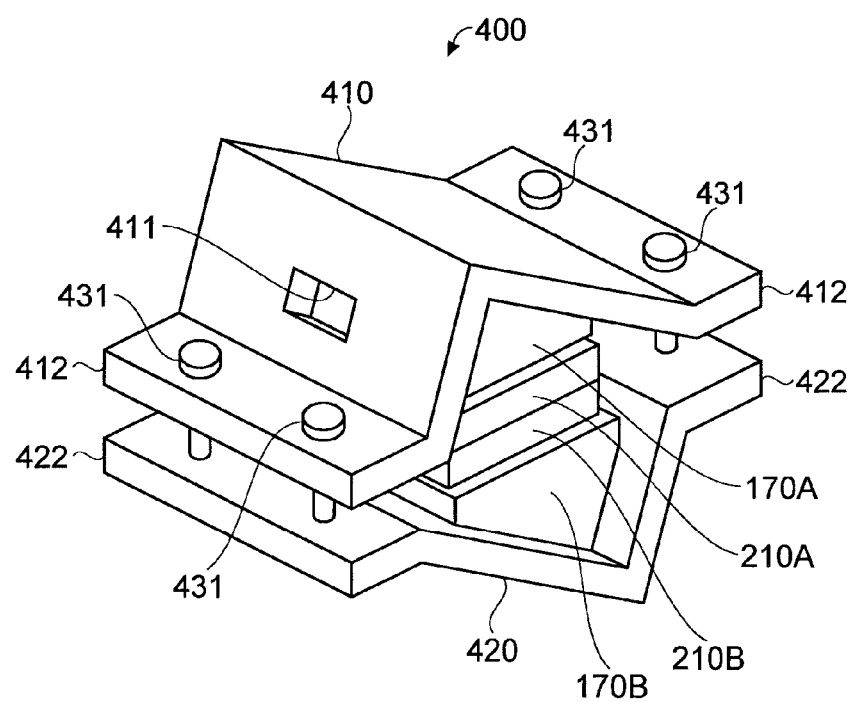
FIG. 19 is a perspective view schematically illustrating the configuration of a holder and the wavelength converter in an eighth embodiment.
Figure 20:
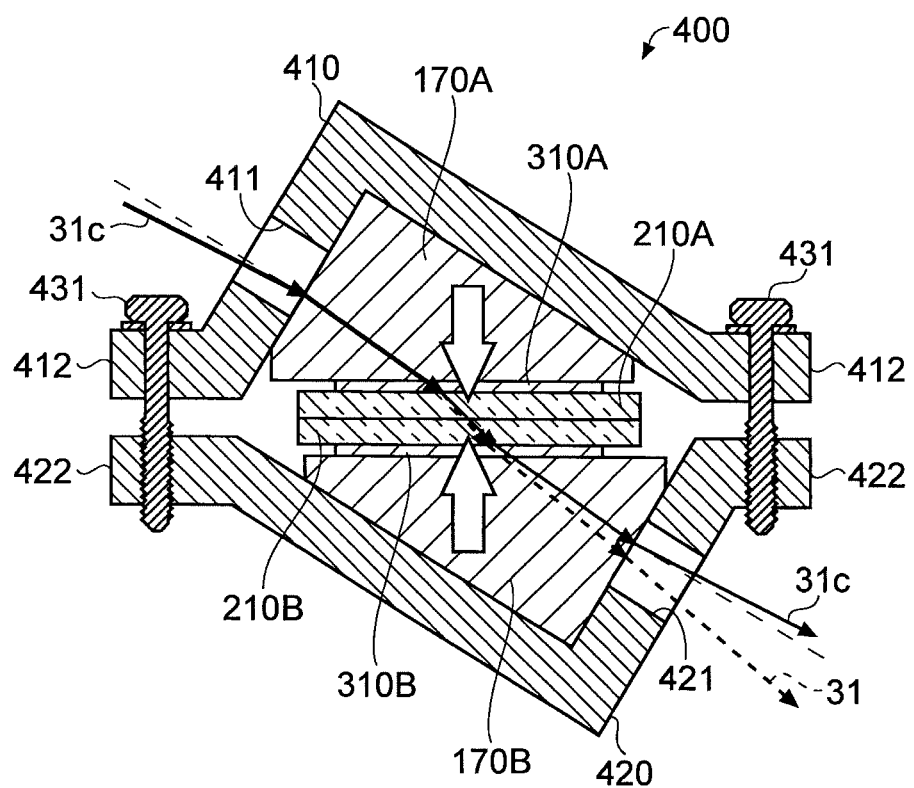
FIG. 20 is a cross sectional view illustrating the wavelength converter illustrated in FIG. 19 that is cut along a plane including an incident plane of laser light incident on the KBBF crystal.

FIG. 19 is a perspective view schematically illustrating the configuration of a holder 400 and the wavelength converter in an eighth embodiment. FIG. 20 is a cross sectional view illustrating the wavelength converter illustrated in FIG. 19 that is cut along a plane including an incident plane of laser light incident on the KBBF crystal 210A.

As illustrated in FIGS. 19 and 20, the wavelength converter may include two prisms 170A and 170B, two KBBF crystals 210A and 210B, and two intermediate layers 310A and 310B, for example. Each of the prisms 170A and 170B and each of the KBBF crystals 210A and 210B may be similar to the prism 110 (including the variations thereof) and the KBBF crystal 210 of the first embodiment described above. Each of the intermediate layers 310A and 310B may be similar to the intermediate layer 310 of the second embodiment described above. However, the configuration of the wavelength converter is not limited to such a configuration, and the wavelength converter having the configuration of any one of the embodiments described above may be used.

The holder 400 may include a first member 410, a second member 420, and a plurality of bolts 431 mutually fixing the first and second members 410 and 420, for example. The material forming each of the first member 410 and the second member 420 may be a metal including iron, copper, aluminum, or the like. However, the material forming the first and second members 410 and 420 is not limited to such metals, and a material having a relatively high rigidity may be used. In this case, a material having a small amount of deformation with respect to heat or stress may be used.

A description will be given of a case in which the right angle prism illustrated in FIG. 5 is used for each of the two prisms. The first member 410 may have a shape capable of making contact with each of two side surfaces not making contact with the intermediate layer 310A, amongst the three side surfaces of the prism 170A, with substantially the same pressure. Similarly, the second member 420 may have a shape capable of making contact with each of two side surfaces not making contact with the intermediate layer 310B, amongst the three side surfaces of the prism 170B, with substantially the same pressure. Similarly, when using the prisms removed of the corners thereof as illustrated in FIGS. 7, 8, and the like, the surfaces to which the first member 410 and the second member 420 make contact are the surfaces 111 and 112 of the prism illustrated in FIG. 7, and the surfaces 111 and 112 of the prism illustrated in FIG. 8.

In a state in which the wavelength converter is held between the first member 410 and the second member 420, the wavelength converter may be held in a state applied with a uniform pressure, by tightening the bolts 431 inserted into two or more screw holes formed in each of the first and second members 410 and 420. This pressure may act in a direction to cause the prism 170A, the intermediate layer 310A, the KBBF crystal 210A, the KBBF crystal 210B, the intermediate layer 310B, and the prism 170B to make contiguous contact with each other.

In addition, a window 411 may be provided on the first member 410 in order to input the pulsed laser light 31c to the incident side prism 170A through the window 411. On the other hand, a window 421 may be provided on the second member 420 in order to emit the pulsed laser light 31c emitted from the emitting side prism 170B through the window 421.

10.2 Effects

By employing a configuration that holds a state in which the pressure is applied in the direction to cause the prism 170A, the intermediate layer 310A, the KBBF crystal 210A, the KBBF crystal 210B, the intermediate layer 310B, and the prism 170B to make contiguous contact with each other, each of contact states may be improved. As a result, the conversion efficiency of the wavelength converter may be improved, and the life of the wavelength converter may be extended.

The description given above are intended to be taken only as examples, and are not to be seen as limiting in any way. Accordingly, it may be clear to those skilled in the art that variations and modifications of the embodiments of the present disclosure may be made without departing from the scope of the appended claims.

The terms used in this specification and in the entirety of the scope of the appended claims are to be interpreted as not being limiting. For example, terms such as "includes" or "included" should be interpreted as not being limited to the item that is described to include or be included. In addition, the terms such as "comprising" and "has" should be interpreted as not being limited to the item that is described to comprise or have. Furthermore, the indefinite article "a" or "an" as used in this specification and the scope of the appended claims should be interpreted as meaning "at least one" or "one or more".

In the embodiments described above, the described examples use a single amplifier 7, however, a plurality of amplifiers 7 may be arranged in series or in parallel. In addition, although the Ti:sapphire laser 6 and the amplifier 7 are pumped by a common pumping laser 5, separate pumping lasers may be used. Moreover, a laser that outputs second harmonic light of an Nd:YLF laser or an Nd:YVO$_4$ laser may be used as the pumping laser 5. Further, a laser that generates second harmonic light of an erbium doped optical fiber laser may be used in place of the Ti:sapphire laser 6. This laser may be pumped by a semiconductor laser. In addition, the wavelength converting device 9 is not limited to the configuration of the present disclosure, and the wavelength converting device 9 may convert the incident light to the wavelength converting device 9 into light having a wavelength in an amplifying wavelength band of the amplifier device 3, such as approximately 193 nm, for example. For example, a CLBO crystal may be used in place of an LBO crystal, as the non-linear optical crystal included in the wavelength converting device 9.

Although the embodiments are numbered as "first embodiment", "second embodiment", . . . , for example, the ordinal numbers do not imply priorities of the embodiments. Many other variations and modifications will be apparent to those skilled in the art.

What is claimed is:

1. A wavelength converter comprising:
   a first non-linear optical crystal having a first contact surface; and
   a first optical member bonded to a region of the first contact surface, located a predetermined distance or more on an inner side from the entire outer periphery of the first contact surface,
   wherein the wavelength converter receives laser light and outputs light having a wavelength different from that of the laser light.

2. The wavelength converter as claimed in claim 1, wherein the first non-linear optical crystal is a KBBF crystal.

3. The wavelength converter as claimed in claim 1, wherein the first non-linear optical crystal and the first optical member are bonded by optical contact.

4. The wavelength converter as claimed in claim 1, wherein the first optical member includes a prism.

5. The wavelength converter as claimed in claim 1, wherein the first non-linear optical crystal has a second contact surface located on an opposite side from the first contact surface, and further comprising:
   a second optical member bonded to a region of the second contact surface, located a predetermined distance or more on an inner side from an outer periphery of the second contact surface.

6. The wavelength converter as claimed in claim 5, wherein the first non-linear optical crystal and the second optical member are bonded by optical contact.

7. The wavelength converter as claimed in claim 5, wherein each of the first and second optical members includes a prism.

8. The wavelength converter as claimed in claim 1, wherein the first non-linear optical crystal has a second contact surface located on an opposite side from the first contact surface, and further comprising:
   a second non-linear optical crystal bonded to the second contact surface.

9. The wavelength converter as claimed in claim 8, wherein the first non-linear optical crystal and the second non-linear optical crystal are bonded by optical contact.

10. The wavelength converter as claimed in claim 8, wherein the second non-linear optical crystal is bonded to a region of the second contact surface, located a predetermined distance or more on an inner side from an outer periphery of the second contact surface.

11. The wavelength converter as claimed in claim 8, wherein the second non-linear optical crystal has a third contact surface in contact with the first non-linear optical crystal, and a fourth contact surface located on an opposite from the third contact surface, and further comprising:
   a second optical member bonded to bonded to a region of the fourth contact surface, located a predetermined distance or more on an inner side from an outer periphery of the fourth contact surface.

12. The wavelength converter as claimed in claim 11, wherein the second non-linear optical crystal and the second optical member are bonded by optical contact.

13. The wavelength converter as claimed in claim 11, wherein each of the first and second optical members includes a prism.

14. The wavelength converter as claimed in claim 1, wherein the first non-linear optical crystal has a second contact surface located on an opposite side from the first contact surface, and further comprising:
   a second non-linear optical crystal having a third contact surface arranged on a side of the first non-linear optical crystal; and
   an intermediate layer bonded to a region of the second contact surface, located a predetermined distance or more on an inner side from an outer periphery of the second contact surface, and bonded to a region of the third contact surface, located a predetermined distance or more on an inner side from an outer periphery of the third contact surface.

15. The wavelength converter as claimed in claim 14, wherein the second non-linear optical crystal has a fourth contact surface on an opposite side from the third contact surface, and further comprising:
   a second optical member bonded to a region of the fourth contact surface, located a predetermined distance or more on an inner side from an outer periphery of the fourth contact surface.

16. The wavelength converter as claimed in claim 15, wherein each of the first and second optical members includes a prism.

17. A wavelength converting device comprising:
   a wavelength converter as claimed in claim 5; and
   a holder configured to hold wavelength converter in a state in which pressure urging the first prism towards the second prism is applied via the first and second intermediate layers and the first and second non-linear optical crystals,
   wherein the wavelength converting device converts the laser light into the light having the wavelength different from that of the laser light.

18. A solid state laser device comprising:
   a laser configured to output laser light;
   an amplifier configured to amplify the laser light; and
   a wavelength converter as claimed in claim 1, and configured to subject the laser light amplified by the amplifier to a wavelength conversion.

19. A laser system comprising:
a solid state laser device as claimed in claim 18; and
an amplifier device configured to amplify the laser light output from the solid state laser device.

\* \* \* \* \*